(12) United States Patent
Van Someren

(10) Patent No.: US 9,979,546 B2
(45) Date of Patent: May 22, 2018

(54) CONTROLLING ACCESS TO A RESOURCE VIA A COMPUTING DEVICE

(71) Applicant: BlackBerry Limited, Waterloo (CA)

(72) Inventor: Nicholas B. Van Someren, Dover, DE (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

(21) Appl. No.: 15/315,360

(22) PCT Filed: May 29, 2015

(86) PCT No.: PCT/US2015/033334
§ 371 (c)(1),
(2) Date: Nov. 30, 2016

(87) PCT Pub. No.: WO2015/184358
PCT Pub. Date: Dec. 3, 2015

(65) Prior Publication Data
US 2017/0126408 A1 May 4, 2017

Related U.S. Application Data

(60) Provisional application No. 62/005,725, filed on May 30, 2014.

(51) Int. Cl.
*G06F 9/00* (2006.01)
*H04L 9/32* (2006.01)
(Continued)

(52) U.S. Cl.
CPC ........ *H04L 9/3228* (2013.01); *G06F 12/1408* (2013.01); *H04L 9/0822* (2013.01);
(Continued)

(58) Field of Classification Search
CPC ....... H04L 63/06; H04L 63/10; H04L 9/0822; H04W 12/04; H04W 12/08
See application file for complete search history.

(56) References Cited

U.S. PATENT DOCUMENTS 5,768,373 A * 6/1998 Lohstroh ................. G06F 21/31
380/286
7,502,475 B2 3/2009 Chen
(Continued)

OTHER PUBLICATIONS

International Search Report and Written Opinion of the International Searching Authority issued in International Application No. PCT/US2015/033334 dated Aug. 31, 2015; 9 pages.
(Continued)

*Primary Examiner* — Abiy Getachew
(74) *Attorney, Agent, or Firm* — Fish & Richardson P.C.

(57) ABSTRACT

The present invention provides methods of, and computer programs and systems for, controlling access to a resource via a computing device configured to perform a method that enables new encrypted versions of a key, encrypted with code values in a sequence of code values that are valid at a future time, to be provided and made available for future performance of the method. This in turn enables a method of user verification that does not require access to a remote server in order to provide one-time passcode verification, and so provides an offline one-tome passcode authentication method that is self-sustaining.

21 Claims, 5 Drawing Sheets

(51) Int. Cl.
*G06F 12/14* (2006.01)
*H04L 9/08* (2006.01)
*H04L 9/14* (2006.01)
*H04L 9/30* (2006.01)

(52) U.S. Cl.
CPC .............. *H04L 9/0863* (2013.01); *H04L 9/14* (2013.01); *H04L 9/30* (2013.01); *H04L 9/3236* (2013.01); *G06F 2212/1052* (2013.01); *G06F 2212/402* (2013.01)

(56) References Cited

U.S. PATENT DOCUMENTS

| | | | |
|---|---|---|---|
| 8,731,191 B2 * | 5/2014 | Wu | G06F 21/6209 358/3.28 |
| 2010/0172504 A1 | 7/2010 | Allen et al. | |
| 2012/0257759 A1 * | 10/2012 | Nick | H04L 9/0822 380/286 |
| 2014/0040637 A1 * | 2/2014 | Hameed | G06F 12/0868 713/193 |
| 2014/0140923 A1 | 5/2014 | Stevenson et al. | |

OTHER PUBLICATIONS

Extended European Search Report issued in European Application No. 15799229.8 dated Dec. 5, 2017; 8 pages.

* cited by examiner

500

```
┌─────────────────────────────┐
│ Receive input defining an   │
│ OTP value, O, and a static  │  502
│ password, pw, of the user   │
└─────────────────────────────┘
              │
              ▼
┌─────────────────────────────┐
│ Hash OTP values with         │
│ corresponding time value,    │
│ and static password          │  504
│                              │
│ H(t) = hash(t, O, pw)        │
└─────────────────────────────┘
              │
              ▼
┌─────────────────────────────┐
│ Perform K modulo squaring   │
│ operations in sequence       │  506
│                              │
│ $H^{2^k}$ mod N              │
└─────────────────────────────┘
              │
              ▼
┌─────────────────────────────┐
│ Generate a verification key  │
│ 226, H'(t), by computing     │
│                              │  508
│ H'(t)=hash($H^{2^k}$ mod N)  │
└─────────────────────────────┘
              │
              ▼
┌─────────────────────────────┐
│ Obtain an encrypted version  │
│ of the master key 208 from   │  510
│ non-volatile storage 106     │
└─────────────────────────────┘
              │
              ▼
┌─────────────────────────────┐
│ Decrypt a version of the     │
│ master key 208 using the     │
│ generated verification key   │  512
│ 226, H'                      │
│                              │
│ decrypt(MK, H')              │
└─────────────────────────────┘
              │
              ▼
┌─────────────────────────────┐
│ Attempt to unlock the        │
│ container using              │  514
│ decrypted MK                 │
└─────────────────────────────┘
```

Figure 5

CONTROLLING ACCESS TO A RESOURCE VIA A COMPUTING DEVICE

CROSS-REFERENCE TO RELATED APPLICATIONS

This application is a U.S. National Stage of PCT/US2015/033334, filed on May 29, 2015, and claims the benefit of U.S. Provisional Patent Application No. 62/005,725, filed May 30, 2014, which is hereby incorporated by reference in its entirety.

BACKGROUND OF THE INVENTION

The present invention relates to methods of, and computer programs and systems for, controlling access to a resource via a computing device.

Data stored in storage media in computer systems is commonly protected by a password or security code to prevent unauthorized access of the data. For applications where high levels of security are required, data may be stored in an encrypted form so that it cannot be read by an unauthorized user who gains access to it.

Cryptographic algorithms are used to encrypt data using an encryption key and fall into two main categories. Asymmetric key algorithms use a pair of cryptographic keys, one of which (commonly referred to as a public key) is used to encrypt data and another of which (commonly referred to as a private key) is used to decrypt data. Symmetric key algorithms encrypt and decrypt data using a single cryptographic key. Once encrypted, the data is unreadable to anyone except those who possess, or are able to generate, the cryptographic key to transform encrypted data into a readable form that can be displayed to the user. The cryptographic key is a security code comprising a string of bits that is input to the encryption algorithm with data to transform the data to/from encrypted form. It is desirable that the string of bits be long enough to provide a sufficient level of unpredictability, or entropy, such that an unauthorized user cannot guess or otherwise break the key by, for example, trying different possible combinations of bits, and decrypt the data.

Typically, users are not required to input the cryptographic key directly, since in secure systems the string of data is too long to be easily remembered or input. More commonly, the user enters a password that is known, or available, only to authorized users, and which is converted using a mathematical transformation such as a hash function into a security code. The security code may then be used as the cryptographic key, or may be used as a seed for the cryptographic key, to encrypt or decrypt data. Commonly, passwords used for these purposes are alphanumeric. Passwords chosen by users tend to have poor entropy and are therefore vulnerable to so-called "shoulder-surfing" attacks in which an unauthorized user observes an authorized user entering their password. To reduce the risk of such attacks and improve security of stored data, these alphanumeric passwords may be generated as one-time passcodes (OTPs). OTPs may be generated, for example, by providing the user with a "tag", "token" or other device containing logic for generating a time and/or event dependent code. Systems that employ OTP verification typically use a hash function to combine a time value or event/sequence number with a secret seed value to produce a set of digits that the user must input to a computing device that is being used to access stored data.

In OTP authentication systems that enable offline authentication, such as the Disconnected Authentication scheme developed by RSA Security Inc., a set of short-term verification codes (for example, possible OTP values) is downloaded from an authentication server to a local system to be subsequently used to verify OTP values presented by a user if the server is unavailable (for example, if the local system does not have a direct connection to a server). However, such systems require that the local device or system connects to the authentication server periodically to download an updated set of verification codes.

It is an object of the present invention to at least mitigate some of the problems of the prior art.

SUMMARY

According to a first embodiment of the present invention, there is provided a method of controlling access to a resource via a computing device, the computing device comprising: a memory storing a first set of data and a second set of data, the first set of data being encrypted using a first key, and the second set of data being different from the first set of data; and a code value generator configured to generate a sequence of code values, wherein the first set of data comprises a second key, and said second set of data comprises at least a first encrypted version of the first key, the first encrypted version of the first key having been encrypted at least partly on the basis of a first one of said sequence of code values and said second key, the method comprising: receiving, at the computing device, a first input, and providing a first code value on the basis of the first input; performing a first decryption process at least partly on the basis of the first code value, the first decryption process comprising decryption of said first encrypted version of the first key; and responsive to successful decryption of said first encrypted version of the first key: performing a second decryption process, the second decryption process being performed on the basis of the first key decrypted during the first decryption process, wherein the second decryption process comprises decryption of at least some of said first set of data; providing access to said resource on the basis of the first key decrypted during the first decryption process; in response to said decryption of at least some of said first set of data, providing at least a second encrypted version of said first key, said second encrypted version of said first key having been encrypted at least partly on the basis of a second one of said sequence of code values and said second key; and storing said second encrypted version of said first key in said memory as data of said second set of data.

The method enables the new encrypted versions of the first key, encrypted with code values in the sequence of code values that are valid at a future time, to be provided and made available for future performance of the method. This in turn enables a method of user verification that does not require access to a remote server in order to provide OTP verification, and so provides an offline OTP authentication method that is self-sustaining.

In some embodiments, the resource to which access is provided comprises data of said first set stored in the memory of the computing device.

In some embodiments, the first encrypted version of the first key has been encrypted using a first value generated using a first code generating function, on the basis of the first one of the sequence of code values and said second key.

In some embodiments, the second decryption process comprises decrypting said second key on the basis of the first key decrypted during the first decryption process, and the method comprises: in response to decrypting said second key, generating the second encrypted version of said first key using a second value generated using the first code generating function, the second value being generated on the basis of the second one of said sequence of code values and said second key; and storing the second encrypted version of said first key in said memory as data of said second set of data.

In some embodiments, the first code generating function is stored in the first set of data.

In some embodiments, the first code generating function uses parameters stored in the first set of data.

In some embodiments, the first decryption process comprises generating a third value using a second code generating function on the basis of said first code value and a third key, different from said second key.

The first value may be equal to said third value.

In some embodiments, the second code generating function takes a greater amount of time to generate said third value than said first code generating function takes to generate said first value.

Providing a second code generating function that takes a greater amount of time to generate the third value than the first code generating function takes to generate said first value, enables fast generation of the encrypted versions of the first key whilst enabling robustness against brute-force attacks due to the slow decryption of the encrypted versions of the first key. In turn, the fast generation of encrypted versions of the first key enable the method to be performed offline (that is, without connecting to a remote server) for extended periods of time without requiring that large amounts of data storage to store encrypted versions of the first and/or without using large amounts of processing resources to generate encrypted versions of the first key. Furthermore, the method can be performed using existing OTP algorithms and so can executed by providing users with existing OTP tokens (which may currently be used for online OTP verification).

In some embodiments, the third key comprises a value equal to the product of two or more prime numbers and the second key comprises said two or more prime numbers.

In some embodiments, the second code generating function comprises a series of modulo multiplication operations.

In some embodiments, the value of each of sequence of code values is determined at least partly on the basis of a position within said sequence.

In some embodiments, each of said sequence of code values is generated at least partly on the basis of a time value.

In some embodiments, the first encrypted version of the first key is encrypted at least partly on the basis of a static password value, and the first input comprises said static password value.

In some embodiments, the method comprises in response to said decryption of at least some of said first set of data, providing a set of encrypted versions of said first key including said second encrypted version and a plurality of further encrypted versions; and storing said plurality of further encrypted versions of said first key in said memory as data of said second set of data.

In some embodiments, the sequence of code values are generated on the basis of a one-time passcode (OTP) generating algorithm.

In some embodiments, the method comprises: storing a seed value for said OTP generating algorithm in said memory as data of said first set of data; in response to said decryption of at least some of said first set of data, providing said seed value to said code value generator; and generating, at said code value generator, said sequence of code values at least partly on the basis of said seed value.

In some embodiments, the first set of data is encrypted on the basis of a symmetric key algorithm.

In some embodiments, the first set of data is encrypted on the basis of an asymmetric key algorithm.

According to a second embodiment of the present invention, there is provided a computing device comprising: a memory storing a first set of data and a second set of data, the first set of data being encrypted using a first key, and the second set of data being different from the first set of data; and a code value generator configured to generate a sequence of code values, wherein the first set of data comprises a second key, and said second set of data comprises at least a first encrypted version of the first key, the first encrypted version of the first key having been encrypted at least partly on the basis of a first one of said sequence of code values and said second key, the computing device being configured to: receive a first input and provide a first code value on the basis of the first input; perform a first decryption process at least partly on the basis of the first code value, the first decryption process comprising decryption of said first encrypted version of the first key; and responsive to successful decryption of said first encrypted version of the first key: perform a second decryption process on the basis of the first key decrypted during the first decryption process, wherein the second decryption process comprises decryption of at least some of said first set of data; provide access to said resource on the basis of the first key decrypted during the first decryption process; provide, in response to said decryption of at least some of said first set of data, at least a second encrypted version of said first key, said second encrypted version of said first key having been encrypted at least partly on the basis of a second one of said sequence of code values and said second key; and store said second encrypted version of said first key in said memory as data of said second set of data.

The computing device of the second embodiment may be adapted to provide features corresponding to any of those of the first embodiment.

The computing device may be a portable device and/or may be a smartphone.

According to a third embodiment of the present invention, there is provided a non-transitory computer readable medium having instructions stored thereon, the instructions being executable by a computing device comprising: a memory storing a first set of data and a second set of data, the first set of data being encrypted using a first key, and the second set of data being different from the first set of data; and a code value generator configured to generate a sequence of code values, wherein the first set of data comprises a second key, and said second set of data comprises at least a first encrypted version of the first key, the first encrypted version of the first key having been encrypted at least partly on the basis of a first one of said sequence of code values and said second key, wherein, when executed by the computing device, the instructions will cause the computing device to: receive a first input and provide a first code value on the basis of the first input; perform a first decryption process at least partly on the basis of the first code value, the first decryption process comprising decryption of said first encrypted version of the first key; and responsive to successful decryption of said first encrypted version of the first key: perform a second decryption process on the basis of the first key decrypted during the first decryption process, wherein the second decryption process comprises decryption of at least some of said first set of data; provide access to said resource on the basis of the first key decrypted during the first decryption process; provide, in response to said decryption of at least some of said first set of data, at least a second encrypted version of said first key, said second encrypted version of said first key having been encrypted at least partly on the basis of a second one of said sequence of code values and said second key; and store said second encrypted version of said first key in said memory as data of said second set of data.

The computer readable medium of the third embodiment may be adapted to provide features corresponding to any of those of the first and second embodiments.

Further features and advantages of the invention will become apparent from the following description of embodiments of the invention, given by way of example only, which is made with reference to the accompanying drawings.

BRIEF DESCRIPTION OF THE DRAWINGS

FIG. 5 is a flow diagram illustrating the steps of a process for decrypting an encrypted version of a master key to enable access to a container according to one or more embodiments of the present invention.

DETAILED DESCRIPTION OF CERTAIN INVENTIVE EMBODIMENTS

Figure 1:
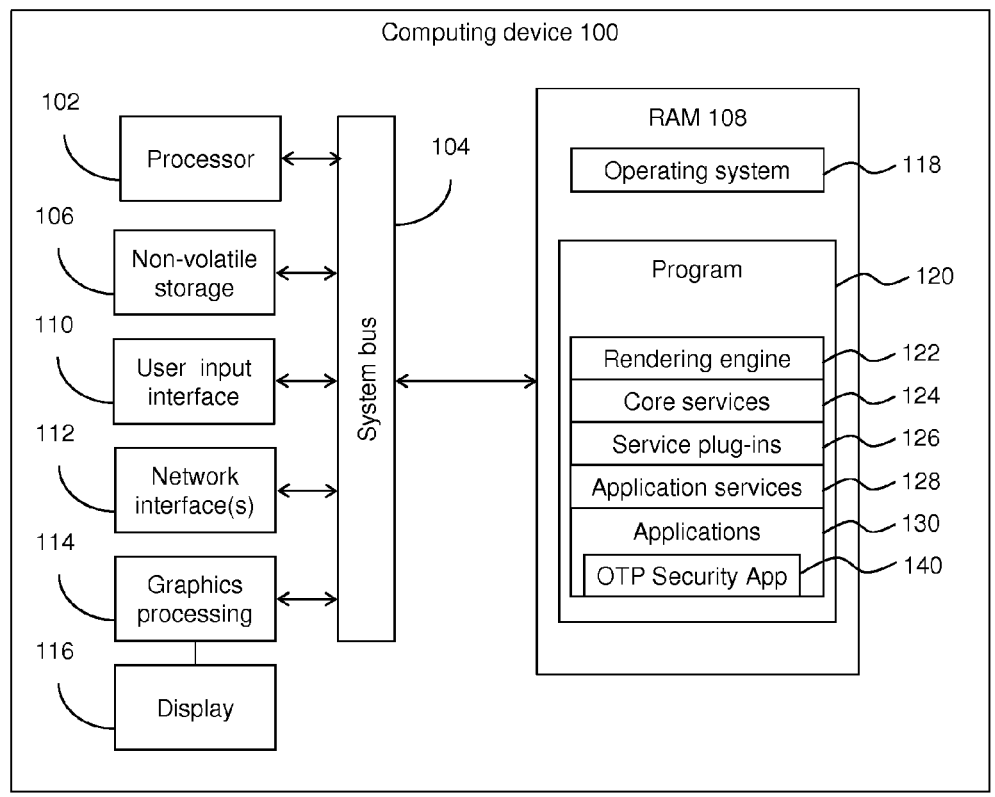
FIG. 1 is a schematic diagram illustrating the components of a computing device according to one or more embodiments of the present invention.

FIG. 1 schematically illustrates the components of a computing device 100, which is an exemplary device used to illustrate the features of an embodiment of the present invention. The computing device 100 may take the form of a Smartphone, a personal digital assistant (PDA), an e-reader, a tablet computer, desktop computer, laptop computer, or any other suitable device. The computing device 100 includes a processor 102 that is able to transmit control messages to, receive status information from, and transmit data to and from components within the computing device 100 that are connected to a system bus 104, where these components may include a non-volatile storage device 106, random access memory (RAM) 108, user input interface 110, network interface 112 and graphics-processing component 114, arranged to output a user interface to a display 116. The processor 102, which is typically a microprocessor, processes instructions stored in the RAM 108 that have been loaded from the non-volatile storage device 106, which could be for example a flash memory or a hard disk drive. These instructions are in the form of computer software in the form of one or more programs that implement an operating system 118 and one or more application programs, referred to hereinafter as programs 120. The RAM 108 is also used by the programs 120 running on the processor 102 as a means of storing and accessing data in the form of electronic signals where the data is used during the execution of the programs 120.

The user input interface 110 receives user input from a user input device or devices (not shown). User input devices may include a keypad, keyboard, touch-screen display, mouse and/or remote control, or any other pointer device, which may be incorporated within the computing device 100 or may be connected to it via a wired or wireless connection.

The computing device 100 may include a network interface 112 (or a plurality of such interfaces) that allows programs 120 running on the processor 102 to transmit and receive data to and from a number of other devices and systems via a communications network or a plurality of such networks. The network interface 112 (or plurality of such interfaces) may be able to connect to the communications network via a wireless access node using one or more of a number of radio access technologies or via a wired technology such as a modem and/or an Ethernet card. The communications network 210 and/or wireless access node may also provide access to the Internet.

The graphics-processing component 114 is able to render graphics in accordance with commands made by the programs 120 running on the processor 102 and output these to a display 116, which may reside within the computing device 100. The display 116 may be an external component connected to the computing device 100 via one or more of composite video, component video, Video Graphics Array, Digital Visual Interface, and High-Definition Multimedia Interface connection. The display 116 may be an integral component of the computing device 100, and may be a touch-screen display.

The operating system 118 is computer software in the form of a program or set of programs whose instructions are loaded from non-volatile storage 106 by the processor 102 and executed when the computing device 100 is turned on. The operating system 118 may start further programs 120 automatically and/or may allow a user to start further programs 120, for example via a user interface provided by the operating system 118. The operating system 118 enables the sharing of the processing power provided by the processor 102 between the programs 120 running on the processor 102.

The operating system 118 provides a programmatic interface for programs 120 running on the processor 102 allowing them to request functionality from the operating system 118. This programmatic interface may take the form of procedures, i.e. system calls, which a program 120 running on the processor 102 may use in order to invoke the operating system 118 and request it to provide desired functionality. In response to receiving a request for functionality, the operating system 118 may transmit control messages to, receive status information from, transmit data to and/or receive data from components (e.g. 106, 108, 110, 112, 114, 116) connected to the system bus 104 in order to provide the requested functionality, and may also return data to the requesting program 120 as a result.

The operating system 118 may provide a file system for storing, modifying, and accessing files or other data held in non-volatile storage 106. The file system may be accessible to other programs 120 running on the processor 102 via the programmatic interface provided by the operating system 118.

The user may use the operating system 118 to start the programs 120 once they are installed on the computing device 100. The programs 120 may include a number of components that are configured to allow the user to access resources and/or data held in non-volatile storage 106 of the computing device 100. These components of the programs 120 may include a rendering engine 122, core services 124, service plug-ins 126, application services 128, and applications 130. These components may use the programmatic interface provided by the operating system 118 (i.e. system calls) to request functionality from the operating system 118 (for example to access the file system, send/receive messages, use the network interface 112, etc.).

The programs 120 running on the processor 102 can process user input obtained from a user input interface 110 that receives user input from a user input device or devices (not shown).

The applications 130 may include an OTP security application 140 that operates as part of an OTP verification system, described below with reference to FIG. 2, and provides a user interface that may be rendered by the graphics processing component 114 and displayed on the display 116. The user interface enables the user to enter identification and authentication details for accessing secured resources of the computing device 100 and/or secured data stored in the non-volatile storage 106. The OTP security application 140 may display an authentication user interface which may be displayed when the user attempts to access secure (encrypted) data. The authentication user interface may also be the first user interface that is displayed to a user when the program 120 is started, or when the computing device 100 is first turned on, or at any other time when a conventional alphanumeric password or security code is required. The OTP security application 140 may also provide a user interface to the user that allows other applications 130 or programs 120 to be started, or connections via the network interface(s) 112 to be launched.

The OTP security application 140 contains an algorithm for encrypting, and/or decrypting, data stored in a cryptographically secured container within the non-volatile storage 106. Encrypted data may be received via the one or more network interfaces 112 (for example, from the one or more remote servers) or may be saved to the non-volatile storage 106 by some other means. For example, data may be manually imported by the user, encrypted using the encryption algorithm, and stored in encrypted form in the non-volatile storage 106.

The data may be encrypted and/or decrypted according to a symmetric key algorithm (i.e. using the same key for both encrypting and decrypting the data), such as the Advanced Encryption Standard (AES), or according to an asymmetric key algorithm (i.e. using one key for encrypting the data and another key for decrypting the data), or by any other suitable cryptographic algorithm. The embodiments described below with reference to FIGS. 2 to 5 are described as being implemented using a symmetric cryptographic algorithm; it will however be understood that, as explained below, they may be implemented using an asymmetric cryptographic algorithm. Irrespective of the type of cryptographic algorithm used, in order for encrypted data to be decrypted so that it can be displayed in a readable form, a cryptographic key, referred to herein as a master key, is provided, which the security application 140 uses in combination with the cryptographic algorithm to decrypt the data.

By requiring that the user enters an OTP in addition to a static password increases resistance to so-called brute force attacks by increasing the entropy of the password. For example, requiring that the user enters a 6 digit OTP in addition to their static password adds approximately 20 bits to the combined password and makes brute force attacks 1,000,000 times more difficult (i.e. requires 1,000,000 times the number of attempts to break the combined password) than if the OTP were not required.

Data encrypted using the master key is stored in encrypted form in a cryptographically secured container in the non-volatile storage 106. One or more encrypted versions of the master key are stored outside the container. To unlock the container and decrypt the data, the encrypted version of the master key is first decrypted using a verification key. The decrypted master key may then be used to unlock the container. This may be done to enable secure transmission of cryptographic keys, and to avoid the need to re-encrypt the entire store of encrypted data when the key is changed (which may be done periodically to maintain the security of the data). In the case of an OTP verification system, the verification key is generally different for each OTP value and so a different encrypted version of the master key, which can be decrypted by the different verification keys, is required for each OTP value.

Figure 2:
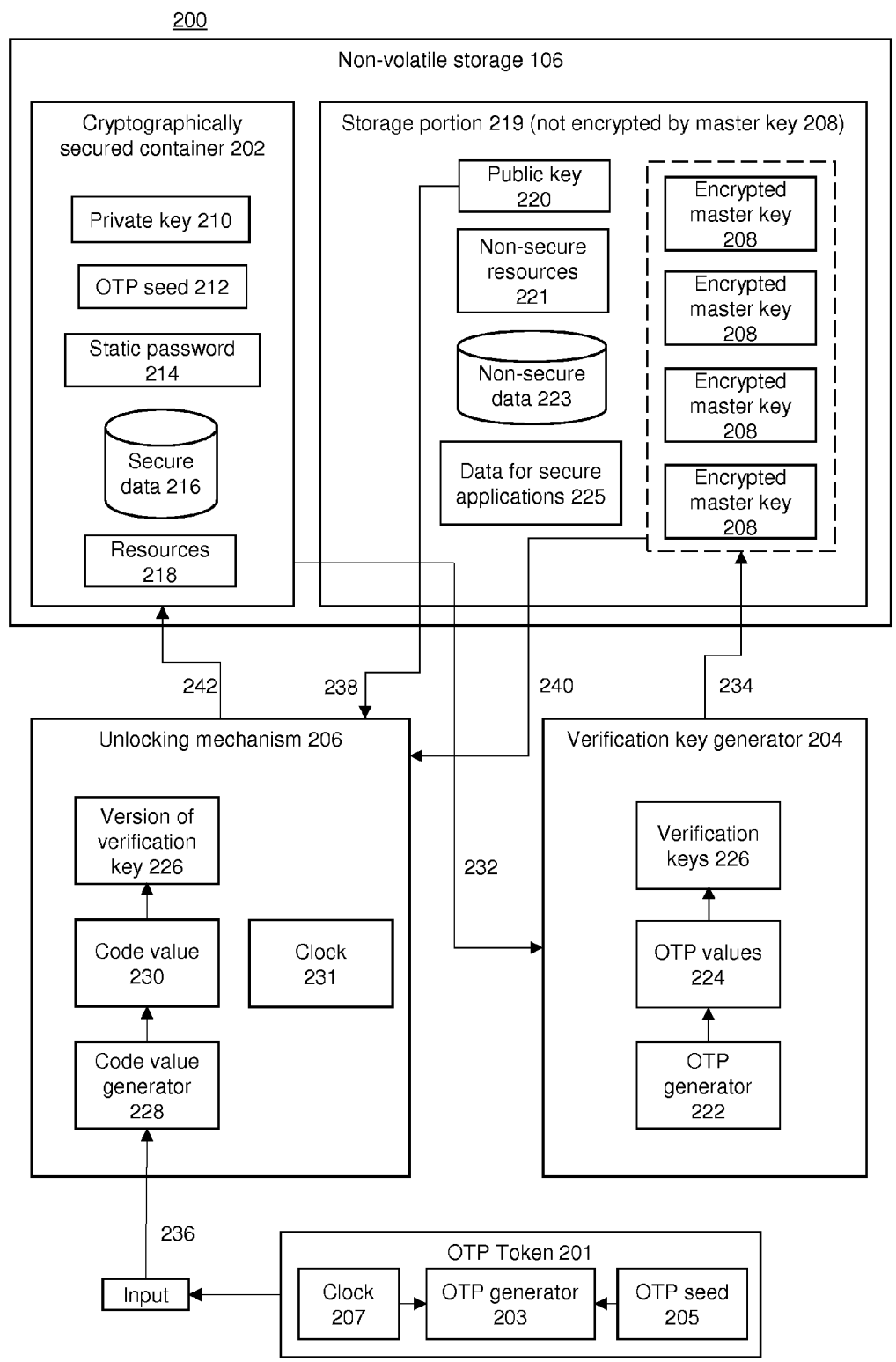
FIG. 2 is a schematic diagram illustrating the components of a verification system according to one or more embodiments of the present invention.

FIG. 2 is a schematic diagram showing the components of an OTP verification system 200 operable on the computing device 100. The verification system 200 comprises a cryptographically secured data storage portion 202, hereinafter referred to as a container 202, which is stored in the non-volatile storage 106. The verification system also comprises a verification key generator 204, and an unlocking mechanism 206.

The OTP verification system 200 is arranged to be used by a user who is provided with, or is able to generate OTP values. For example, the user may be provided with an OTP token 201 which may be implemented on a device separate to the computing device 100, or may be implemented by an application running on the computing device 100. The OTP token 201 contains an OTP generator arranged to generate OTP values according to an OTP algorithm and also contains an OTP seed value 205 and a clock 207. The OTP generator 203 is arranged to generate OTP values according to the OTP algorithm based. The OTP algorithm may be any algorithm capable of generating a code value that is valid for only one session (i.e. period of time) or transaction (event). Such an algorithm may derive the OTP values 224 based on a current time, based on a previous OTP value 224, or based on an event count. For example, OTP values may be generated in sequence according to a random value generating algorithm that is not necessarily time-dependent.

In the example shown in FIG. 2, the OTP generator 203 is arranged to generate OTP values based on the seed value 205 and a current time value from the clock 207. The generated OTP values are then provided to the user to use with the OTP verification system 200. For example, the OTP token may be provided with a display (not shown) that displays a current OTP value generated by the OTP generator 203.

In the embodiment of FIG. 2, the container 202 is encrypted using a symmetric encryption algorithm and the resources 218 contained within the container 202 can be locked and/or unlocked using a first key referred to hereinafter as a master key 208. The container 202 contains a first set of data including a copy of a second key referred to hereinafter as a private key 210, an OTP seed 212 and, where applicable, a copy of the static password 214 of the user. The container 202 may additionally contain data 216 or other resources 218 that the user wishes to keep secure.

Outside of the container 202 is a portion of the non-volatile storage 106, which is not encrypted by the master key 208, in which a second set of data including a public key 220 is stored. This portion of the non-volatile storage 106 is referred to hereinafter as a storage portion 219. Encrypted versions of the master key 208, as well as resources 221 and data 223 that are not secured, may be stored in the storage portion 219. Secure applications 225, such as email applications, which require user authentication prior to granting access to a user may also be stored in the storage portion 219.

The private key 210 is mathematically linked to the public key 220. The public key 220 is stored in the storage portion 219 (i.e. it is not securely stored in the container 202 but it is at least difficult, in the timeframe of the OTP, to derive the private key 210 from the public key 220. For example, the public key 220 may be the product of two large prime numbers, N and possibly other values, such as an iteration count, K, which provides a further increased security factor. The private key 210 may be the factorization of the public key 220, P, Q (i.e. the two large prime numbers plus any other value included) and optionally some other values computed from the factors of the public key 220. For example, the public key 220 may be a 1024 bit key, comprising 512 bit prime numbers, and there may be 1,000,000 iterations, K.

The verification key generator 204 includes an OTP generator 222, arranged to generate a sequence of OTP values 224, which are the same OTP values as the values provided to the user by the OTP token 201. For example, the OTP generator 222 may include the same OTP generation algorithm which operates on an OTP seed 212 having the same value as the OTP seed 205 used by the OTP token 201 to produce the same OTP value as the OTP token 201 for a given time value.

OTP values of any length may be used. Using OTP with a higher number of digits increases the number of possible OTP values and therefore increases the resistance of the OTP verification system 200 to so-called brute-force attacks. Since a brute-force attacker does not have the private key 210, tests of each possible value can take a significant time, and increasing the number of possible OTP values reduces the probability of a brute-force attacker finding the correct OTP value within the lifetime of an OTP value.

The verification key generator 204 generates, using a first code generating function, verification keys 226 to be used to encrypt copies of the master key 208 so that they can be securely stored in the storage portion 219 (i.e. in areas of the non-volatile storage 106 that are outside of the container 202). To generate encrypted copies of the master key 208, the verification key generator 204 obtains a copy of the private key 210 and a copy of the OTP seed 212 from the container 202 (indicated by arrow 232), and generates verification keys 226 on the basis of the OTP values 224 (generated on the basis of the OTP seed 212) and the private key 210. The verification keys 226 are each used to encrypt a different encrypted version of the master key 208. The verification key generator 204 then stores the encrypted versions of the master key 208 in the storage portion 219 of the non-volatile storage 106 (indicated by arrow 234).

The unlocking mechanism 206 is arranged to receive input (indicated by arrow 236), for example via the user input interface 110. The input may include an OTP value generated by the OTP token 201 and a static password of the user. A code value generator 228 receives the input and generates a code value 230 based on the received input, and a time value determined from a clock 231, which is synchronized with a clock in the user's OTP token, for example. The unlocking mechanism 206 then generates, using a second code generating function, a version of the verification key 226 for decrypting the encrypted versions of the master key 208. Verification keys 226 generated by the unlocking mechanism 206 are generated on the basis of the code value (which is generated on the basis of the received input) and the public key 220, which is obtained from the storage portion 219 of the non-volatile storage 106 (indicated by arrow 238). The unlocking mechanism 206 obtains one or more encrypted versions of the master key 208 from the storage portion 219 of the non-volatile storage 106 (indicated by arrow 240) and uses the verification key 226 that it has generated to attempt to decrypt an encrypted version of the master key 208. Once an encrypted version of the master key 208 has been successfully decrypted, the unlocking mechanism 206 uses the decrypted master key 208 to unlock the container 202 (indicated by arrow 242).

Figure 3:
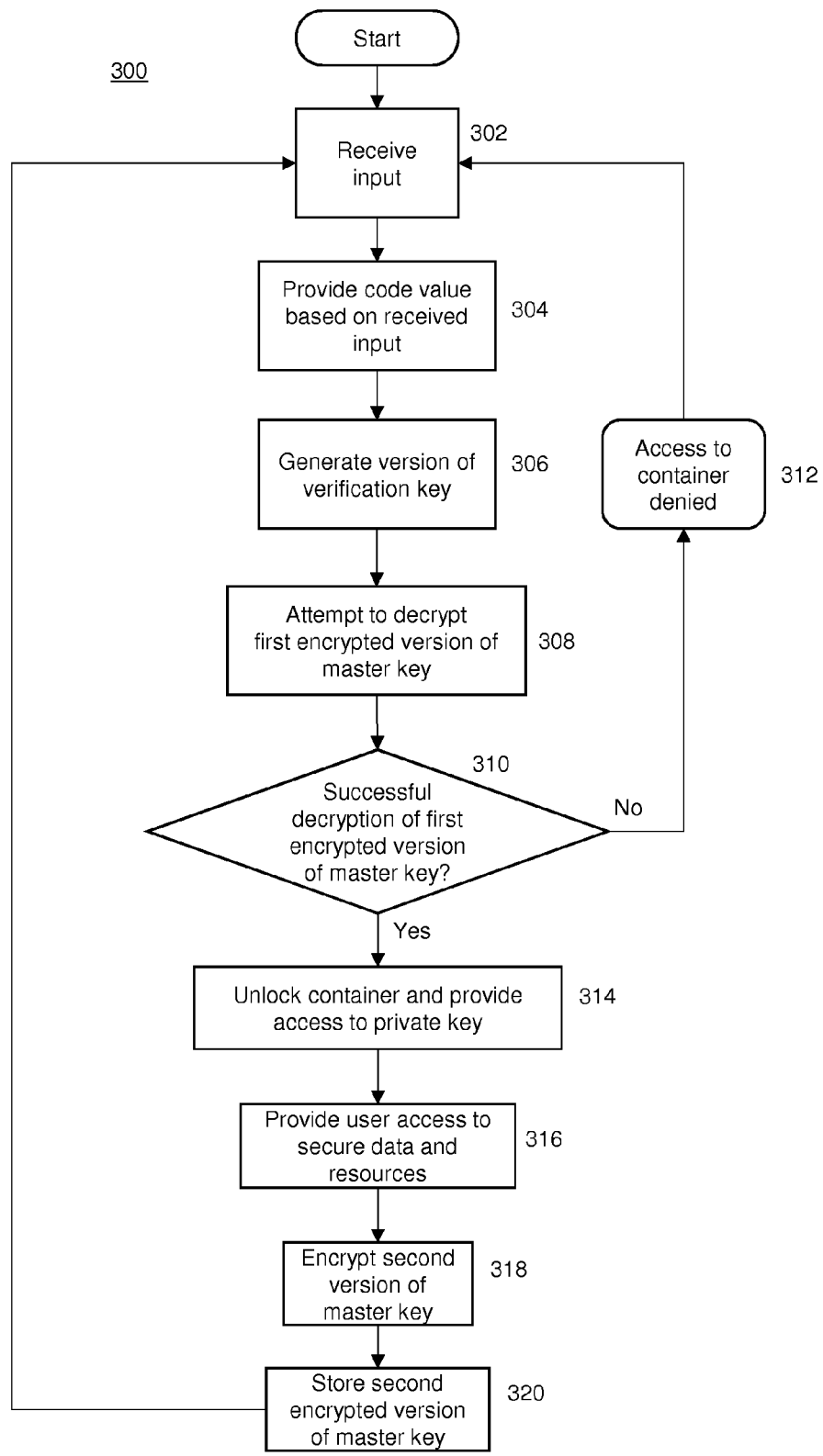
FIG. 3 is a flow diagram illustrating the steps of providing a method for providing OTP verification of a user and controlling access to a resource according to one or more embodiments of the present invention.

FIG. 3 is a flow diagram showing the steps of a method 300 for providing OTP verification of a user and controlling access to a resource via a computing device, performed by the OTP verification system 200 shown in FIG. 2.

At step 302, the unlocking mechanism 206 receives input, which may be user input received through the user input interface 110. The input includes an OTP value (that the user obtains from an OTP token, for example) and may also include a static password of the user. The unlocking mechanism 206 then provides an input code value based on the received input at step 304. The input code value may, for example, be a combination of the OTP value, the static password of the user, and a current time value.

At step 306, the unlocking mechanism 206 generates a version of a verification key 226, for a first decryption process for decrypting an encrypted version of the master key 208 that has previously been encrypted with a verification key 226 generated by the verification key generator 204, as described below with reference to FIG. 4. Versions of the verification key 226 generated by the unlocking mechanism 206 are generated on the basis of the code value (which is generated on the basis of the received input) and the public key 220, as described below with reference to FIG. 5.

At step 308, the unlocking mechanism 206 attempts to decrypt one or more of the encrypted versions of the master key 208 using the version of the verification key 226 it has generated. Since the encrypted versions of the master key 208 are encrypted and decrypted using a symmetric encryption algorithm, if the verification key 226 generated by the unlocking mechanism 206 corresponds with a verification key 226, such that at step 310 there is successful decryption of an encrypted version of the master key 208, the unlocking mechanism 206 is able to decrypt an encrypted version of the master key 208.

A version of the verification key 226 generated by the unlocking mechanism 206 is able to unlock any encrypted version of the master key 208 that was encrypted using a verification key 226 (generated by the verification key generator 204) having the same value. However, because the verification keys 226 are generated on the basis of OTP values that are hashed, only an encrypted version of the master key 208 corresponding to the time or event for which a particular version of the verification key 226 generated by the unlocking mechanism 206 is able to be decrypted using that version of the verification key 226.

Encrypted versions of the master key 208 may be tagged with the time or event for which a corresponding version of the verification key 226 is valid to enable the verification system 200 to only attempt to decrypt a current encrypted version of the master key 208. For example, the verification system 200 may only attempt to decrypt encrypted versions of the master key 208 that are tagged with times close to a current clock time.

In order to prevent decryption of old or expired encrypted versions of the master key 208, and therefore reduce the risk of a brute force attack succeeding by encrypted such an expired version of the master key 208, the verification system 200 may delete encrypted versions of the master key 208 that are tagged with a time or event that has passed, or is identified in any other appropriate way as being old or expired.

If the verification key 226 generated by the unlocking mechanism 206 does not match a verification key 226 that was used to encrypt an encrypted version of the master key 208, at step 310 there is not successful decryption of an encrypted version of the master key 208, and the unlocking mechanism 206 is therefore unable to unlock the container 202 to provide access to the resources and data within the container 202; that is, access to the resource is denied, at step 312.

Once the unlocking mechanism 206 has decrypted an encrypted version of the master key 208, it unlocks the container 202 using the master key 208 in a second decryption process at step 314. This provides access, for the verification key generator 204, to the private key 210, the OTP seed 212 and, where applicable, to the static password 214 of the user. While the container 202 is open the user is able, at step 316, to access secure data 216 and/or resources 218 that are within the container 202.

In some embodiments the decrypted master key 208 may be used to authenticate the user to a resource such as a secure application 225 outside of the container 202, in addition or as an alternative to authenticating access to resources within the container 202. For example, the master key 208 may be used to authenticate the user to an email application (e.g. by acting as a password to the application) that provides its own encryption of data and stores that data in the storage portion 219 of the non-volatile storage 106 (i.e. a portion of the non-volatile storage 106 that is not encrypted with the master key 208).

At step 318, the verification key generator 204, which accesses the private key 210, the OTP seed value 212 and, where applicable, the static password 214 of the user, stored in the container 202, generates one or more further encrypted versions of the master key 208, as described below with reference to FIG. 4. Since the verification key generator 204 has access to the private key 210, it is able to generate verification keys 226 for encrypting versions of the master key 208 more quickly (using fewer computational resources) than the unlocking mechanism 206 (which only has access to the public key 220 and not the private key 210) can generate versions of verification keys 226 for decrypting encrypted versions of the master key 208.

At step 320, the one or more further encrypted versions of the master key 208 are stored in the storage portion 219 of the non-volatile storage 106 (i.e. outside of the container 202), for use in unlocking the container 202 in subsequent iterations of the method 300.

Figure 4:
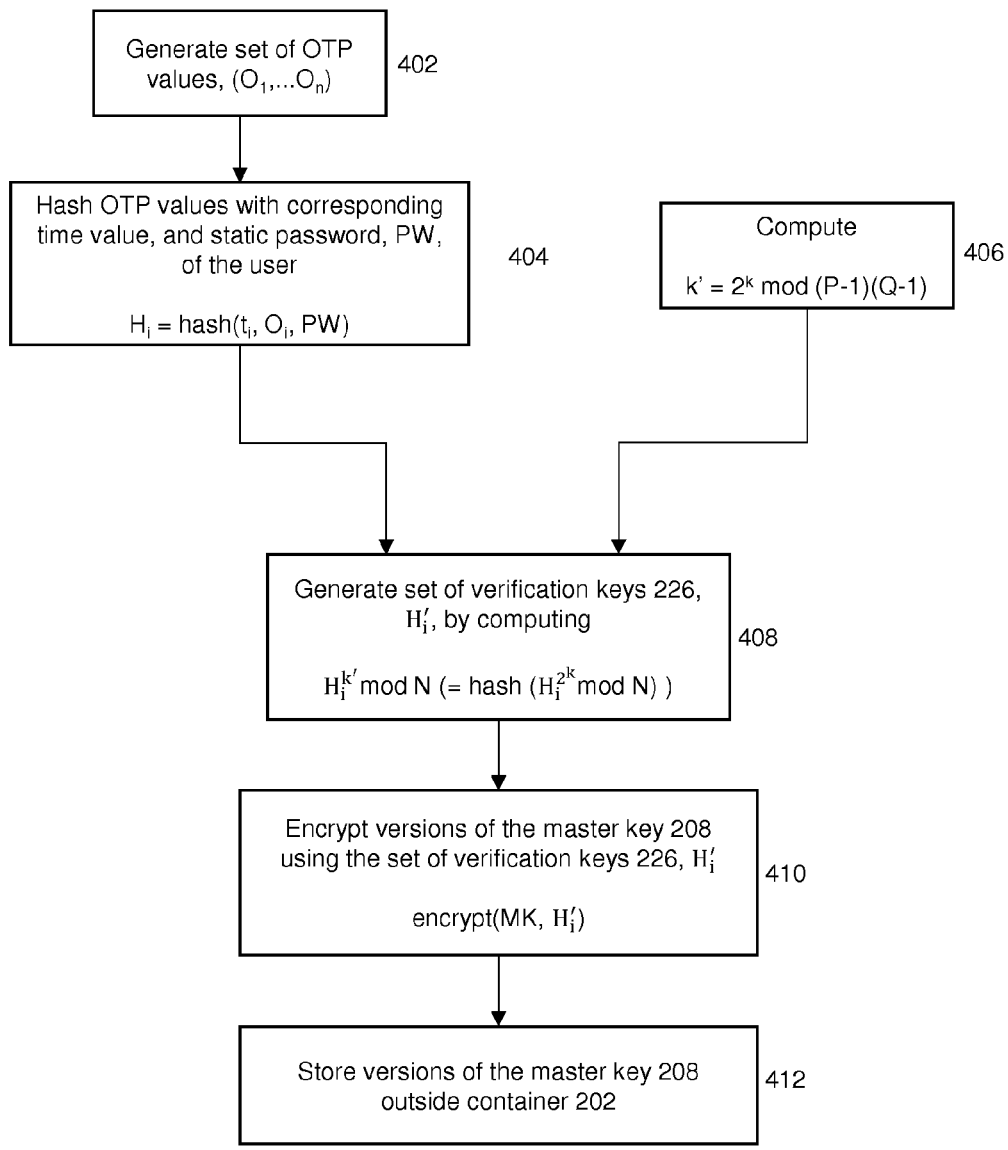
FIG. 4 is a flow diagram illustrating the steps of a process for generating encrypted versions of a master key according to one or more embodiments of the present invention.

FIG. 4 is a flow diagram showing an encryption process 400 for generating encrypted version of a master key 208 (denoted by MK) for a set of times, t=1, . . . , t=n, using the verification key generator 204. The set of times is generated to cover a period of time during which the user may be expected to unlock the container 202 at least once. Typically, the set of times will span several days, to allow the user to be able to continue accessing secured data and resources offline provided the container 202 is unlocked at least once during that time span. In the event that a user does not access their container 202 at least once within the prescribed time limit (such that the OTP verification system 200 is unable to generate new encrypted versions of the master key 208 for times beyond the time limit), the verification system 200 may require that the user performs an online verification process to unlock the container 202, thereby enabling the verification key generator 204 to generate new encrypted versions of the master key 208.

The separation of the times in the set of times may be any value. Closer separation between times results in the OTP value and the valid encrypted version of the master key 208 changing more often, and therefore results in a higher degree of security of the contents of the container 202. Typically, the separation between times is in the range of 30 seconds to 60 seconds; for example, in a system in which the separation between times is 30 seconds, the valid OTP value changes every 30 seconds. However any suitable separation between times may be used.

At step 402, the verification key generator 204 generates a set of OTP values 224, O1, . . . , On, by operating the OTP generation algorithm of the OTP generator 222 using the seed value 212 obtained from the container 202 and the set of times, such that each OTP value corresponds to a time in the set of times.

At step 404, for each OTP value 224, the verification key generator 204 computes a combined value relating to the OTP value 224 (denoted by Oi), the corresponding time value (denoted by ti), and (optionally) the static password of the user (denoted by pw). The combined value may be computed using a one-way function, which ensures that the constituent values cannot easily be determined from the combined values (e.g. cannot feasibly be determined within the lifetime of the OTP value). For example, the verification key generator 204 may generate a combined, hashed value, Hi using a cryptographic hash function, given by:

$$Hi = \text{hash}(ti, Oi, pw).$$

As described above, to encrypt versions of the master key 208, the verification key generator 204 generates a set of verification keys 226. The encrypted versions of the master key 208 are typically 32 bytes long, which means that the verification key 226 used to encrypt the encrypted versions of the master key 208 is also typically 32 bytes long, because the cryptographic algorithm used to encrypt and decrypt the encrypted versions of the master key 208 is symmetric. Since the public key 220 is typically much longer (i.e. comprises more bits) than the encrypted versions of the master key 208 (for example the public key 220 may comprise 1024 bits, comprising two 512 bit prime numbers), the verification key 226 used is generated using another hash function which generates another hashed value, H'i, that is 32 bytes long and is generated using the hashed value generated at step 404, Hi, the public key 220 (denoted by N), and an iteration count (denoted by K). Each verification key 226 therefore has a value of H'i, given by:

$$H'i = \text{hash}(H\_i^{\wedge}(2^{\wedge}k) \bmod N).$$

Since the factorization of N (i.e. the private key 210) is known, values of H'i that form the verification keys 226 generated by the verification key generator 204 can be computed relatively quickly by first computing, at step 406:

$$k' = 2k \bmod (P-1)(Q-1);$$

and then computing, at step 408:

$$Hi^{k'} \bmod N.$$

As shown in FIG. 4, the value of k' may be computed separately from the generation of the combined value, H'i. The value of k' may, for example, be computed and stored in the container 202 prior to the operation of the verification key generator 204, and accessed by the verification key generator 204 when the container 212 is unlocked. Alternatively, the value of k' may be computed at run time while the verification key generator 204 is generating verification keys 226.

The time taken to compute H'i when the values of P and Q are known is less than the time taken to compute the value of H'i when the values of P and Q are not known. For example, using a 1024 bit public key 220 (comprising 512 bit prime numbers and 1,000,000 count iterations, K, the time taken to generate a verification key 226 using the verification key generator 104 (that is, with access to the private key 210) is about 0.25 millisecond on a typical desktop computer in 2013 and about 1 millisecond on a typical smartphone in 2013 (the verification key generator 204 operating on a typical smartphone in 2013 can generate one day's worth of verification keys 226 in about 3 CPU-seconds).

At step 410, the verification key generator 204 then uses each of the generated verification keys 226 to encrypt a version of the master key 208 using a symmetric encryption algorithm, given by:

$$\text{encrypt}(MK, H'i).$$

Thus a set of encrypted versions of the master key 208, each generated with a different verification key 226 (based on a different OTP value) is generated.

At step 412, the set of encrypted versions of the master key 208 is stored in the storage portion 219 non-volatile storage 106 (i.e. outside the container 202). The set of encrypted versions of the master key 208 are then available for subsequent attempts by the user to unlock the container 202 using the unlocking mechanism 206.

The length of the encrypted versions of the master key 208 may be chosen to balance the entropy of the key encryption with the available storage. For example, the encrypted versions of the master key may be 32 bytes long. With 32 byte long encrypted versions of the master key 208 and with each encrypted version of the master key 208 being valid for a period of 30 seconds, the data storage capacity required to store encrypted versions of the master key 208 for one day is about 92 kB. In order to limit the data storage requirement, the verification system 200 may require that users access the container 202 at least once within a pre-scribed time limit; for example, at least once every few days. In the event that a user does not access their container 202 at least once within the prescribed time limit (such that the OTP verification system 200 is unable to generate new encrypted versions of the master key 208 for times beyond the time limit), the verification system 200 may require that the user performs an online verification process to unlock the container 202, thereby enabling the verification key generator 204 to generate new encrypted versions of the master key 208.

FIG. 5 is a flow diagram showing a decryption process 500 for decrypting an encrypted version of the master key 208 using the unlocking mechanism 206.

To decrypt an encrypted version of the master key 208 the unlocking mechanism 206 is required to successfully generate a version of a verification key 226 having the same value as a verification key 226 that was generated by the verification key generator 204 and used to encrypt an encrypted version of the master key 208. That is, the unlocking mechanism 206 must generate a verification key 226 having a value, H', given by:

$$H' = \text{hash}(H'(2^k) \bmod N) = \text{hash}(H\_i^{\hat{}}(2^k) \bmod N).$$

To generate a verification key 226, the unlocking mechanism 206 receives input, such as user input at step 502. The input comprises a current OTP value (denoted by O) and possibly the static password of the user (denoted by PW). The current OTP value may be obtained by the user from an OTP token 201, for example.

At step 504, the unlocking mechanism computes a combined value relating to the current OTP value, the current time value (denoted by t) which may be determined from the clock 231 and the static password of the user (denoted by pw). The combined value may be computed using a one-way function, which ensures that the constituent values cannot easily be determined from the combined values (e.g. cannot feasibly be determined within the lifetime of the OTP value). For example, the unlocking mechanism 206 may generate a combined, hashed value, H, using a cryptographic hash function, given by:

$$H = \text{hash}(t, O, pw).$$

Since neither the unlocking mechanism 206 nor the user has access to the private key 210 (only to the public key 220), to generate a version of the verification key 226 having the same value as the verification key 226 that was used to encrypt a given encrypted version of the master key 208 requires the unlocking mechanism 206 to derive or compute the verification key 226 using a different process to that used by the verification key generator 204.

To generate a version of a verification key 226, at step 506, the unlocking mechanism 206 performs K modulo squaring operations in sequence to determine the value:

$$H'(2^k) \bmod N.$$

At step 508, the unlocking mechanism performs another hashing operation. As described above with reference to step 408 of FIG. 4, a version of the verification key 226 is generated using another hash function so that the verification key has a fixed length (for example, 32 bytes) that corresponds with the length of the encrypted versions of the master key 208, and is typically shorter in length than the public key 220. Therefore, the version of the verification key 226 is generated using the hashed value generated at step 504, H, the public key 220 (denoted by N), and an iteration count (denoted by K). The verification key 226 generated by the unlocking mechanism 206 has a value of H', given by:

$$H' = \text{hash}(H'(2^k) \bmod N).$$

The values of H' that form the verification keys 226 generated by the unlocking mechanism 206 are therefore calculated without knowing the factorization of N (i.e. without access to the private key 210) by performing k modulo squaring operations in sequence, whereas the values of H'i that form the verification keys 226 generated by the verification key generator 204 are calculated knowing the factorization of N (the private key 201). Therefore, the computation performed by the verification key generator 204 is less computationally intensive than that performed by the unlocking mechanism 206, and so the verification key generator 204 can generate a verification key 226 for encrypting an encrypted version of the master key 208 more quickly than the unlocking mechanism 206 can generate the same verification key 226 for decrypting an encrypted version of the master key 208.

At step 510, the unlocking mechanism obtains an encrypted version of the master key 208 from the storage portion 219 non-volatile storage 106. In this respect, the unlocking mechanism 206 may only obtain an encrypted version of the master key 208 that corresponds to a current time value, or may obtain all stored encrypted versions of the master key 208. The unlocking mechanism 206 may hold the obtained encrypted version(s) of the master key 208 in RAM 108.

At step 512, the unlocking mechanism 206 uses the verification key 226 it has generated to decrypt an encrypted version of the master key 208 corresponding to the current time. Decryption of the encrypted version of the master key 208 is performed using the same symmetric encryption algorithm used by the verification key generator 204 to encrypt the encrypted version of the master key 208, given by:

decrypt(*MK,H'*).

The process by which the unlocking mechanism 206 generates a version of the verification key 226 for decrypting encrypted versions of the master key 208 typically takes significantly longer than the process by which the verification key generator 204 generates verification keys 226 for encrypting encrypted versions of the master key 208. For example, using a 1024 bit public key 220 (comprising 512 bit prime numbers and 1,000,000 count iterations, K, the time taken to generate a verification key 226 using the unlocking mechanism 206 (that is, without access to the private key 210) is about 500 milliseconds on a typical desktop computer in 2013 and about 2 seconds on a typical smartphone in 2013. Therefore, the unlocking mechanism 206 takes about 2,000 times longer to generate a verification key 226 than the verification key generator 204. The difference between the time taken by the verification key generator 204 to generate the verification key 226 and the time taken by the unlocking mechanism 206 to generate the same key 226 provides robustness against brute-force attacks, because the unlocking mechanism 206 is slow, whilst allowing fast generation of the encrypted versions of the master key 208, because verification key generator 204 is fast. In turn, the fast generation of encrypted versions of the master key 208 enable the OTP verification system 200 to be operated offline (that is, without connecting to a remote server) for extended periods of time without requiring that large portions of the non-volatile storage 106 are dedicated to storing encrypted versions of the master key 208, or that large amounts of processing time is devoted to generating encrypted versions of the master key 208. Furthermore, the verification system 200 can be implemented using existing OTP algorithms and so can be used in conjunction with existing OTP tokens (which may currently be used for online OTP verification).

The above embodiments are to be understood as illustrative examples of the invention. Further embodiments of the invention are envisaged. For example, in the above description of the OTP verification system, the verification key generator 204 is described as being external to the container 202, and is only able to access the private key 210 and the OTP seed 212, when the container 202 is unlocked. However, the verification key generator 204 may itself be stored within the container 202 and may thus hold a copy of the private key 210 and the OTP seed 212. In response to the container 202 being unlocked, the verification key generator 204 may remove expired encrypted versions of the master key 208 (that is, for times in the past) from the storage portion 219 of the non-volatile storage 106, and initiate a process for generating a new set of future encrypted versions of the master key 208.

Although in the method described above the unlocking mechanism 206 obtains encrypted versions of the master key 208 from the storage portion 219 of the non-volatile storage 106, it will be understood that the encrypted versions of the master key 208 may be passed to the unlocking mechanism 206 by the verification key generator 204 either at the time of generation or at any time thereafter. The unlocking mechanism 206 may then store the encrypted versions of the master key 208 in the storage portion 219 of the non-volatile storage 106, or may just store the encrypted versions of the master key 208 temporarily in RAM 108.

Although in the embodiment described above with reference to FIGS. 4 and 5, the combined values relating to the time value, the OTP value and the static password of the user are described as being computed using a one-way function such as a hash function, it will be understood that any suitable function for combining these values may be used. For example, the combined values may be computed by concatenating the time value, OTP value and static password of the user.

The above embodiments are described in the context of a symmetric encryption scheme in which the same key, the master key 208, is used for both locking and unlocking the container 202. However, it will be understood that a suitable asymmetric encryption scheme may also be used with the verification system 200. In such a system, the verification key generator 204 generates multiple encrypted versions of the master key 208, which forms the private part of an asymmetric key pair for unlocking the container 202. A corresponding public part of the asymmetric key pair, for locking the container 202, is stored outside of the container 202. Such an implementation of the verification system 200 using an asymmetric key algorithm enables data, for example, to be put into the container 202 (i.e. encrypted) while the container 202 is either locked or unlocked but only taken out of the container 202 (i.e. decrypted) while the container 202 is unlocked.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling access to a resource via a computing device, the computing device comprising:
   a memory storing a first set of data and a second set of data, the first set of data being encrypted using a first key, and the second set of data being different from the first set of data; and
   a code value generator configured to generate a sequence of code values,
   wherein the first set of data comprises a second key, and said second set of data comprises at least a first encrypted version of the first key, the first encrypted version of the first key having been encrypted at least partly on the basis of a first one of said sequence of code values and said second key, the method comprising:
   receiving, at the computing device, a first input, and providing a first code value on the basis of the first input;
   performing a first decryption process at least partly on the basis of the first code value, the first decryption process comprising decryption of said first encrypted version of the first key; and
   responsive to successful decryption of said first encrypted version of the first key:

performing a second decryption process, the second decryption process being performed on the basis of the first key decrypted during the first decryption process, wherein the second decryption process comprises decryption of at least some of said first set of data;

providing access to said resource on the basis of the first key decrypted during the first decryption process;

in response to said decryption of at least some of said first set of data, providing at least a second encrypted version of said first key, said second encrypted version of said first key having been encrypted at least partly on the basis of a second one of said sequence of code values and said second key; and storing said second encrypted version of said first key in said memory as data of said second set of data.

2. The method according to claim 1 in which the resource to which access is provided comprises data of said first set stored in the memory of the computing device.

3. The method according to either of claim 1, in which the first encrypted version of the first key has been encrypted using a first value generated using a first code generating function, on the basis of the first one of the sequence of code values and said second key.

4. The method according to claim 3, in which the second decryption process comprises decrypting said second key on the basis of the first key decrypted during the first decryption process, and the method further comprises:

in response to decrypting said second key, generating the second encrypted version of said first key using a second value generated using the first code generating function, the second value being generated on the basis of the second one of said sequence of code values and said second key; and storing the second encrypted version of said first key in said memory as data of said second set of data.

5. The method according to claim 3, in which the first code generating function is stored in the first set of data or in which the first code generating function users parameters stored in the first set of data.

6. The method according to claim 3, in which the first decryption process comprises generating a third value using a second code generating function on the basis of said first code value and a third key, different from said second key.

7. The method according to claim 6, in which the first value is equal to said third value.

8. The method according to claim 6, in which said second code generating function takes a greater amount of time to generate said third value than said first code generating function takes to generate said first value.

9. The method according to claim 8, in which said third key comprises a value equal to the product of two or more prime numbers and the second key comprises said two or more prime numbers, and in which said second code generating function comprises a series of modulo multiplication operations.

10. The method according to claim 1, in which the value of each of sequence of code values is determined at least partly on the basis of a position within said sequence.

11. The method according to claim 1, in which each of said sequence of code values is generated at least partly on the basis of a time value.

12. The method according to claim 1, in which the first encrypted version of the first key is encrypted at least partly on the basis of a static password value, and the first input comprises said static password value.

13. The method according to claim 1, further comprising:

in response to said decryption of at least some of said first set of data, providing a set of encrypted versions of said first key including said second encrypted version and a plurality of further encrypted versions; and storing said plurality of further encrypted versions of said first key m said memory as data of said second set of data.

14. The method according to claim 1, in which the sequence of code values are generated on the basis of a one-time passcode (OTP) generating algorithm.

15. The method according to claim 14, further comprising:

storing a seed value for said OTP generating algorithm in said memory as data of said first set of data;

in response to said decryption of at least some of said first set of data, providing said seed value to said code value generator; and generating, at said code value generator, said sequence of code values at least partly on the basis of said seed value.

16. The method according to claim 1, in which said first set of data is encrypted on the basis of a symmetric key algorithm or an asymmetric key algorithm.

17. The method according to claim 1, in which said first set of data is encrypted on the basis of an asymmetric key algorithm.

18. A computing device comprising:

a memory storing a first set of data and a second set of data, the first set of data being encrypted using a first key, and the second set of data being different from the first set of data; and a code value generator configured to generate a sequence of code values, wherein the first set of data comprises a second key, and said second set of data comprises at least a first encrypted version of the first key, the first encrypted version of the first key having been encrypted at least partly on the basis of a first one of said sequence of code values and said second key, the computing device being configured to:

receive a first input and provide a first code value on the basis of the first input;

perform a first decryption process at least partly on the basis of the first code value, the first decryption process comprising decryption of said first encrypted version of the first key; and responsive to successful decryption of said first encrypted version of the first key:

perform a second decryption process on the basis of the first key decrypted during the first decryption process, wherein the second decryption process comprises decryption of at least some of said first set of data;

provide access to said resource on the basis of the first key decrypted during the first decryption process;

provide, in response to said decryption of at least some of said first set of data, at least a second encrypted version of said first key, said second encrypted version of said first key having been encrypted at least partly on the basis of a second one of said sequence of code values and said second key; and store said second encrypted version of said first key in said memory as data of said second set of data.

19. The computing device according to claim 18, wherein the computing device is a portable device.

20. The computing device according to claim 19, wherein the computing device is a smartphone.

21. A computer program comprising instructions executable by a computing device comprising:
a memory storing a first set of data and a second set of data, the first set of data being encrypted using a first key, and the second set of data being different from the first set of data; and
a code value generator configured to generate a sequence of code values,
wherein the first set of data comprises a second key, and said second set of data comprises at least a first encrypted version of the first key, the first encrypted version of the first key having been encrypted at least partly on the basis of a first one of said sequence of code values and said second key,
wherein, when executed by the computing device, the computer program causes the computing device to:
receive a first input and provide a first code value on the basis of the first input; perform a first decryption process at least partly on the basis of the first code value, the first decryption process comprising decryption of said first encrypted version of the first key; and
responsive to successful decryption of said first encrypted version of the first key:
perform a second decryption process on the basis of the first key decrypted during the first decryption process, wherein the second decryption process comprises decryption of at least some of said first set of data;
provide access to said resource on the basis of the first key decrypted during the first decryption process;
provide, in response to said decryption of at least some of said first set of data, at least a second encrypted version of said first key, said second encrypted version of said first key having been encrypted at least partly on the basis of a second one of said sequence of code values and said second key; and
store said second encrypted version of said first key in said memory as data of said second set of data.

* * * * *

UNITED STATES PATENT AND TRADEMARK OFFICE
CERTIFICATE OF CORRECTION

PATENT NO. : 9,979,546 B2
APPLICATION NO. : 15/315360
DATED : May 22, 2018
INVENTOR(S) : Nicholas Van Someren Page 1 of 1

It is certified that error appears in the above-identified patent and that said Letters Patent is hereby corrected as shown below:

On the Title Page

Item (57) (Abstract), Line 9, Delete "one-tome" and insert -- one-time --, therefor.

In the Claims

In Column 18, Line 9, In Claim 13, delete "m" and insert -- in --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*